(12) United States Patent
Zielonka

(10) Patent No.: US 10,494,069 B2
(45) Date of Patent: Dec. 3, 2019

(54) MARITIME SAFETY SYSTEM

(71) Applicant: TRZ SCIENCE LLC, Pompano Beach, FL (US)

(72) Inventor: Simon John Zielonka, Salisbury (GB)

(73) Assignee: TRZ SCIENCE LLC, Pompano Beach, FL (US)

( * ) Notice: Subject to any disclaimer, the term of this patent is extended or adjusted under 35 U.S.C. 154(b) by 6 days.

(21) Appl. No.: 15/748,357

(22) PCT Filed: Jul. 26, 2016

(86) PCT No.: PCT/GB2016/052287
§ 371 (c)(1),
(2) Date: Jan. 29, 2018

(87) PCT Pub. No.: WO2017/017438
PCT Pub. Date: Feb. 2, 2017

(65) Prior Publication Data
US 2018/0215452 A1    Aug. 2, 2018

(30) Foreign Application Priority Data

Jul. 29, 2015 (GB) .................................. 1513377.0

(51) Int. Cl.
*B63C 9/00* (2006.01)
*G01S 13/86* (2006.01)
(Continued)

(52) U.S. Cl.
CPC ............ *B63C 9/0005* (2013.01); *G01S 7/415* (2013.01); *G01S 13/867* (2013.01); *G01S 13/88* (2013.01)

(58) Field of Classification Search
CPC ..... B63C 9/0005; G01S 7/415; G01S 13/867; G01S 13/88
(Continued)

(56) References Cited

U.S. PATENT DOCUMENTS

| 5,799,083 A * | 8/1998 | Brothers .............. G08G 1/0175 348/E7.06 |
| 8,659,432 B2 * | 2/2014 | Alicea-Ibern ........ G08B 21/088 340/539.11 |

(Continued)

FOREIGN PATENT DOCUMENTS

| EP | 1849703 A2 | 10/2007 |
| GB | 2493390 A | 6/2013 |
| WO | 2017017438 A1 | 2/2017 |

OTHER PUBLICATIONS

GB Search Report and Written Opinion issued in connection with corresponding GB Application No. GB1513377.0 dated Dec. 14, 2015, 1 page.

(Continued)

*Primary Examiner* — Jack K Wang
(74) *Attorney, Agent, or Firm* — Hoffman Warnick LLC

(57) ABSTRACT

Disclosed is an apparatus for detecting an object falling from a vessel (1), comprising: a plurality of sensor nodes (100) arranged to be installed around a periphery of the vessel (1), each of the plurality of sensor nodes being provided with a Radar sensor (200) and a video sensor (300); and a control system (400), arranged to receive signals from the plurality of sensor nodes and to determine if the received signals indicate a possible Man Overboard MOB event.

9 Claims, 4 Drawing Sheets

(51) Int. Cl.
*G01S 7/41* (2006.01)
*G01S 13/88* (2006.01)

(58) Field of Classification Search
USPC .................................................. 340/573.6
See application file for complete search history.

(56) References Cited

U.S. PATENT DOCUMENTS

| | | | | |
|---|---|---|---|---|
| 8,810,436 | B2* | 8/2014 | Zagami | G08B 13/183 |
| | | | | 340/573.6 |
| 9,106,810 | B1* | 8/2015 | Hadsall, Sr. | G08B 21/086 |
| 9,558,643 | B2* | 1/2017 | Inchausti | G08B 21/086 |
| 9,569,671 | B1* | 2/2017 | Maali | H04N 7/181 |
| 9,729,802 | B2* | 8/2017 | Frank | H04N 5/33 |
| 9,896,170 | B1* | 2/2018 | Assal | B63C 9/0005 |
| 2009/0219160 | A1* | 9/2009 | Shervey | B63C 9/0005 |
| | | | | 340/573.6 |
| 2013/0169809 | A1* | 7/2013 | Grignan | B63C 9/0005 |
| | | | | 348/148 |
| 2013/0214942 | A1* | 8/2013 | Joss | G08B 21/088 |
| | | | | 340/984 |

OTHER PUBLICATIONS

International Search Report and Written Opinion issued in connection with corresponding PCT Application No. PCT/GB2016/052287 dated Jun. 10, 2016, 9 pages.

\* cited by examiner

MARITIME SAFETY SYSTEM

The present invention is concerned with a system for detecting the occurrence of a person falling from a ship or other oceangoing vessel. Such events are routinely referred to as man overboard (MOB) events.

Holidaying aboard a cruise ship is a popular activity and such cruise ships can often accommodate many hundreds or even thousands of passengers. Whilst steps are taken to ensure that passengers are safe and unable to fall from open decks, accidents do sometimes occur which can result in a passenger falling into the sea from the ship. Such an incident is obviously serious and can have grave consequences. Aside from the possible human cost, the owner or operating company of the cruise ship can face severe penalties and damages claim, as well as the accompanying bad publicity.

At times of darkness or in heavy seas, it can be difficult, or even impossible, to locate a passenger, even if an alarm has been raised. Sometimes, a passenger can fall from a ship unnoticed by any other person and it may be several hours or even days until the their absence is noted. Sometimes the absence is not noted until the ship reaches its final destination, many days later.

Figures are available which suggest that since the year 2000, there have been more than 200 MOB events, many of which have resulted in death.

Cruise ship operators and owners are keen to prevent MOB events wherever possible and the design of cruise ships tends to incorporate features such as elevated safety rails, such that access from the decks is impeded. However there is a desire to provide systems which are able to detect an MOB event and to alert crew members so that appropriate action may be taken.

Appropriate action may involve a manual search of the sea and/or launching a lifeboat or other vessel from the cruise ship to search for and rescue the fallen passenger.

Of course, MOB events can also occur on other vessels, such as cargo ships and ferries as well as from static ocean platforms such as oil and drilling rigs. Embodiments of the present invention may find utility in any or all of these particular environments It is an aim of embodiments of the present invention to provide a system which is able to accurately, and in a timely manner, detect a person falling from a vessel and to alert crew members so that appropriate action may be taken.

According to the present invention there is provided an apparatus and method as set forth in the appended claims. Other features of the invention will be apparent from the dependent claims, and the description which follows.

According to a first aspect of the present invention, there is provided an apparatus for detecting an object falling from a vessel, comprising:
a plurality of sensor nodes arranged to be installed around a periphery of the vessel, each of the plurality of sensor nodes being provided with a Radar sensor and a video sensor; and
a control system, arranged to receive signals from the plurality of sensor nodes and to determine if the received signals indicate a possible Man Overboard MOB event.

Preferably, a possible MOB event is determined on the basis of a Radar return, having a magnitude greater than a predetermined minimum, being received at one of the plurality of sensor nodes and the return being associated with an object having a velocity within a predefined range of velocity values. Advantageously, this allows falling objects to more readily distinguished from e.g. birds.

Preferably the plurality of sensor nodes are arranged to be positioned about a periphery of the vessel such that at least some of the plurality of sensor nodes are arranged to cover a volume of space defined by a relatively small distance from a surface of the vessel and an arc, located substantially parallel with the surface of the vessel, wherein the arc substantially extends in an upwards direction such that each of the plurality of sensor nodes is thereby arranged to be sensitive to objects falling towards it. By providing sensor nodes which point substantially upwards, the effect of surface clutter can be ameliorated. In heavy seas, wave crests could easily impinge on the monitored region and could interfere in the detection process.

Preferably the arc is defined by two extremes, a first being substantially horizontal, and the second being at a predetermined angle from the first.

Preferably the predetermined angle is in the range 100-140°.

Preferably if a possible MOB event is determined, then video data from the video sensor of the sensor node is captured and displayed on a control panel, the video data including data captured from before the MOB event and after the MOB event.

Preferably the apparatus is further arranged to display the captured video data in a repeating loop, to facilitate user confirmation of the possible MOB event.

Preferably the apparatus is further arranged to timestamp the video data and to store it in an encrypted form in an archive.

Preferably the timestamped and encrypted video data is stored in a remote location, not ordinarily accessible to a user.

Preferably the periphery includes some or all of the external perimeter of the vessel.

According to a second aspect of the present invention, there is provided a method of detecting a possible MOB event, comprising the steps of: Continuously scanning a plurality of regions of interest using a Radar sensor, and if a possible MOB event is indicated by the Radar sensor, displaying to a user, video data captured contemporaneously with the possible MOB event such that a confirmation can be made.

For a better understanding of the invention, and to show how embodiments of the same may be carried into effect, reference will now be made, by way of example, to the accompanying diagrammatic drawings in which.

Figure 1:
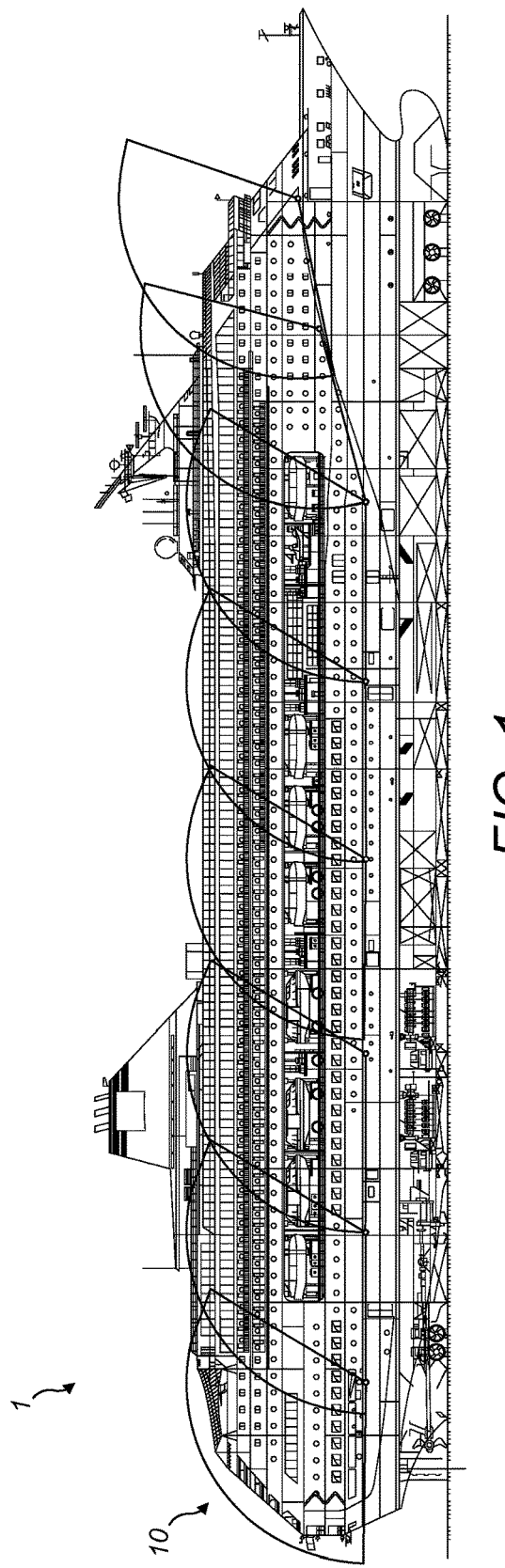
FIG. 1 shows a side view of a vessel equipped with a detection system according to an embodiment of the present invention.

FIG. 1 shows a vessel 1—a cruise ship, in this example—equipped with an embodiment of the present invention. Disposed around a perimeter or periphery of the vessel are a plurality of sensor nodes 100, each operable to monitor a defined region 10 of the vessel. The region monitored by each node is indicated by the shaded arcs 10 in FIG. 1. In some instances, it may be required to provide complete 360° coverage around the entire periphery of a vessel and, in other instances, only certain areas are required to be monitored. References to the perimeter or periphery should thus be understood to refer to some or all of the external area of a vessel.

FIG. 1 shows only the starboard side of the vessel 1, but a similar arrangement is provided on the port side of the vessel. Further sensor nodes are provided to the bow and stern of the vessel as well. This ensures complete 360° coverage of the perimeter of the vessel 1. The precise configuration of each sensor node, in terms of the region it covers, is dictated to a large extent by the shape and configuration of the vessel to which it is attached. For instance, the stern of a ship can take a range of different shapes quite unlike the sides of a ship, which are usually substantially flat and uniform. As such, the precise configuration of a given node will depend upon where it is located.

Each of the sensor nodes 100 is provided with a Radar sensor and a video sensor. The Radar sensor operates as the primary sensor and continuously scans its designated region 10 seeking out an object falling from the vessel. Details of the Radar sensor will be given in the following paragraphs.

If the Radar sensor detects a falling object, then video imagery captured contemporaneously by the video sensor is made available to the crew for the purposes of verifying the possible MOB event. The means by which a possible MOB event is triggered will be described later.

Figure 2A:
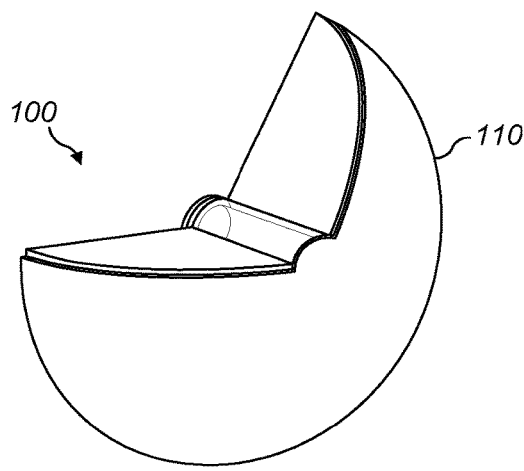
FIG. 2a shows a perspective view of a sensor node according to an embodiment of the present invention.

FIG. 2a shows a perspective view of a sensor node 100. The sensor node 100 resembles a dome structure with a sector removed. The angular coverage of the sensor node 100 is broadly aligned to the removed sector. The domed section of the sensor node is a radome 110, provided to protect the sensor node. It is formed from plate metal and the entire sensor node is arranged to be welded or otherwise attached to the side of the vessel. The actual size of the radome 110 may vary but is typically of the order of 800 mm in diameter.

Figure 2B:
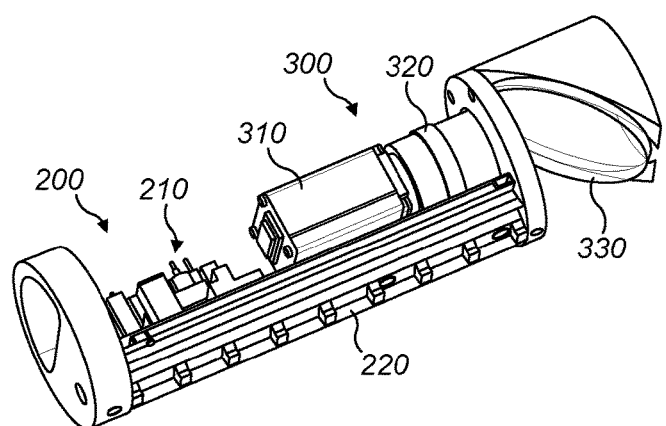
FIG. 2b shows a perspective view of an assembly comprising a Radar and video sensor according to an embodiment of the present invention.

Located inside the radome 110 is the Radar sensor 200 and also the video sensor 300, as shown in FIG. 2b. The Radar sensor 200 comprises Radar transceiver 210, and antenna 220 operable to transmit and receive Radar signals to illuminate a target and to receive reflections from that same target.

The video sensor 300 comprises a camera and Digital Video Recorder (DVR) module 310 for capturing and recording video data or footage. The camera collects images via lens 320 and angled mirror 330. The lens and mirror are selected and arranged to provide an angle of view as close as possible to that obtained from the Radar sensor 200.

Figure 2C:
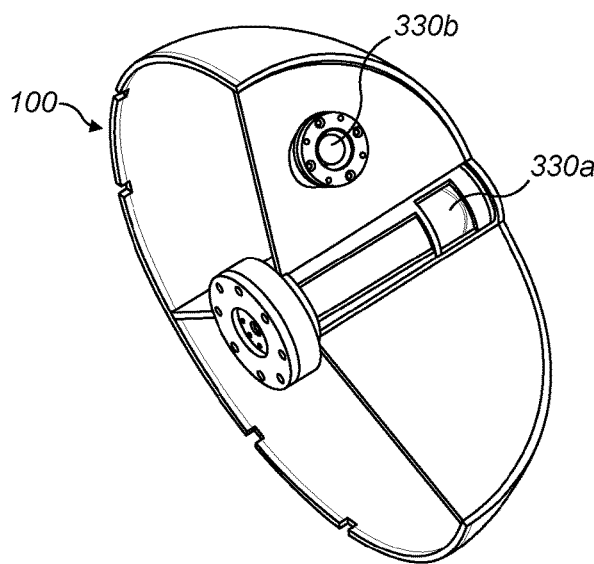
FIG. 2c shows a sensor node according to an embodiment of the invention with two alternative positions for the placement of the video sensor.

FIG. 2c shows a view of the radome 100 into which is installed the Radar sensor 200 and video sensor 300. This also shows two alternative locations for the video sensor input, labelled 330a, which comprises an angled mirror to direct image data into the lens 320, and also an input labelled 330b which may be a different mirror location or a lens for capturing video image data.

The plurality of sensor nodes 1000 are provided at spaced intervals around the perimeter of the vessel. The scanning direction, which is dictated by the orientation of the radome, particularly the missing sector, is arranged to point substantially upwards towards the top of the vessel 1. This can be seen in FIG. 1 where the angular coverage 10 of any given sensor node extends from a line essentially parallel to the sea surface or horizon through approximately 120°. In this way, there is a small degree of overlap between adjacent sensor regions, but this ensures that there are no 'blind spots'.

Figure 3:
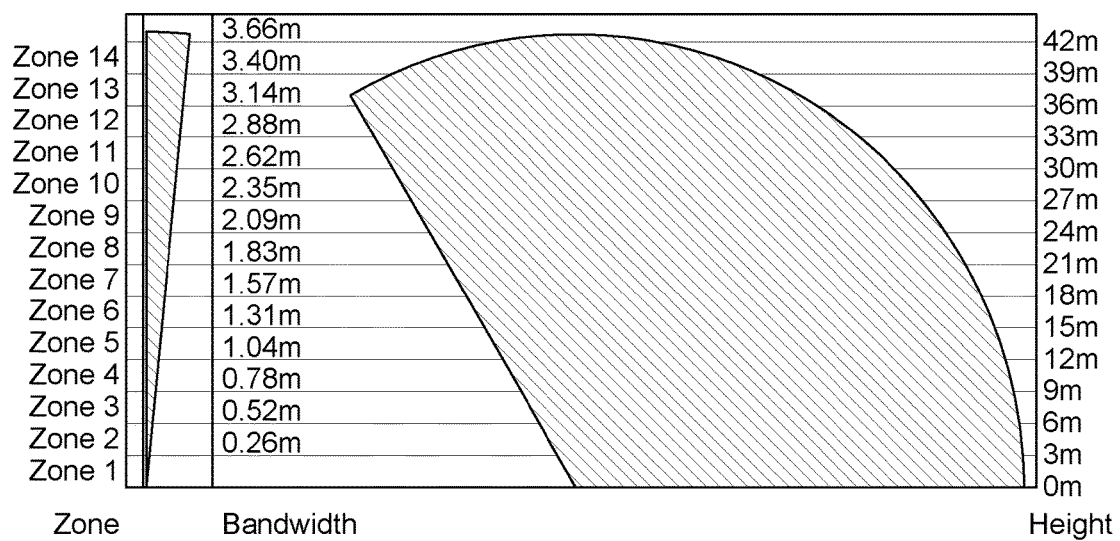
FIG. 3 shows a representation of the volume of space monitored by a given sensor node.

FIG. 3 shows a representation of the volume of space which is monitored by any given sensor node. The leftmost plot shows the distance from the node or side of the vessel which is covered. As can be seen, the scan volume only extends a relatively short distance from the side of the vessel and is intended to capture objects falling in close proximity to the vessel.

The rightmost plot shows the coverage arc, which is arranged to be substantially parallel with the side of the vessel i.e. substantially perpendicular to the area covered shown in the leftmost plot. The angular coverage is of the order of 120°, although this can be adjusted depending on the structure of the vessel to be monitored. There should, ideally, be a degree of overlap between neighbouring sensor nodes so that there are no 'blind spots'. Typically, angular coverage in the range of 100-140° is suitable for sensors mounted on the side of a ship. Sensor nodes mounted at the bow or stern may require different angular coverage, due to the different shapes of these parts of a ship.

The benefit of this arrangement is that it allows the system to be sensitive to objects falling from the vessel and therefore necessarily beginning their journey on the vessel and not moving a great distance from it, whilst at the same time being relatively insensitive to objects such as sea birds, which might be present in the vicinity of the vessel, but are generally likely to be located at a further distance from the vessel.

By positioning the sensor nodes in this way so that they are essentially pointing upwards towards the sky rather than downwards towards the sea surface, it has been found that detection of MOB events is more accurate, in the sense that there are fewer false positives. This, it is believed, is primarily due to the presence of less Radar clutter if the Radar sensor is essentially pointing skywards, as opposed to the situation where a Radar sensor points downwards towards the sea surface. The sea surface is typically choppy and returns a more "noisy" signal than if it were pointing skywards. This is particularly the case in heavy seas, where wave crests can produce sizeable Radar returns. However in embodiments of the present invention, this is not an issue, since the detection direction is pointing away from the sea surface.

Furthermore, in order to avoid false positive detections triggered by birds, it is found that birds typically fly in the region of the top of the vessel and above, rather than alongside it. As such, if the Radar sensors were located at the top of the vessel pointing downwards, there is a higher likelihood of a bird triggering a false positive detection. When the Radar sensors are located lower down the vessel, pointing skywards, as in FIG. 1, the birds are typically further away from the Radar sensor and so do not produce a return of a magnitude associated with a falling person. This assists in avoiding false positive detections.

In order to further distinguish between an object falling from the vessel under gravity and another object such as a bird, the Radar sensor is arranged to be sensitive to the velocity of detected objects and uses the measured velocity as a further discriminant. If an object is detected by a particular Radar sensor, in the sense that a sufficiently large return is received from the object present in the designated area 10 of the Radar sensor, then the velocity of that object is determined and if it falls outside a predefined range, then it is discounted as a body falling under gravity.

This can be best exemplified by a bird flying close to the vessel and being detected within the area 10 of a particular Radar sensor. The return, especially from a large bird, may be sufficient to suggest a human body falling. However, if the bird is flying alongside the vessel rather than swooping downwards, then it will not have the velocity required to suggest a body falling under gravity and so the initial detection does not go on to trigger a possible MOB event, since the velocity profile is not within the defined range.

The sensor nodes 100 each comprise a Radar sensor 200 and a video sensor 300. The Radar sensor 200 takes the form of a 24 GHz spread-spectrum Doppler shift Radar operating at a low-power. The Doppler-shift functionality allows the Radar to calculate velocity, but is also used to cancel out any precipitation returns, or clutter, which can decrease detection errors. Other frequencies and configuration of Radar may be used and the details given above are exemplary only.

The Radar sensor 200 is operable to be active at all times and continuously scans the region 10 associated with it. The video sensor is also continuously operable and records moving video images into a fixed length data buffer. Upon detection of a possible MOB event by the Radar sensor, an alarm is generated at the bridge of the vessel and the crew are alerted to a possible MOB situation.

In order to trigger a possible MOB event, one Radar sensor 100 must receive a return signal, reflected from an object in its region of coverage 10. Each sensor is calibrated to ensure that only objects larger than a specified minimum dimension will return a signal large enough to qualify as a possible human body, rather than a bird or other possible trigger object. Once such a return is received, this is classified as a possible MOB event, which triggers an alarm on the system control panel, normally located on the bridge or other control room of the vessel. The specified minimum dimension is typically chosen to represent a small child.

As part of the alarm generation, a looping video is presented on the control panel so that a crew member can review the captured video data to assess whether the possible MOB event is genuine or not. The looping video runs from a few seconds (e.g. 3 seconds) before the detection point and for a few seconds (e.g. 10 seconds) afterwards. Since video data is captured continuously, it is always possible to acquire video footage of the time before an event is triggered, and so the looping video which is presented to the crew is bound to include images of the falling object, thereby allowing visual confirmation to take place.

In a typical situation, each sensor node includes, or has associated with it, a digital memory capable of recording a certain amount of video footage. The video data is continuously recorded. Once the available storage is full, data is overwritten starting from the earliest recorded data. In this way, it is possible to ensure that footage from the time before any possible event is also captured.

In addition to presenting the looping video to the crew via the control panel, a copy of the looping video is date and time stamped, encrypted and stored in a secure archive. This is done for evidential purposes, in case it is necessary to review evidence of any events at a future date. The encrypted and archived version of the looping video is stored separately to the main system in a secure location and is not ordinarily accessible to the crew, to avoid possible tampering.

If a particular node detects a possible MOB event, then video footage is also captured from its neighbouring nodes. This additional footage is also displayed to the crew, in case it reveals anything of note. The additional video footage is also timestamped and encrypted and stored with the primary footage.

Furthermore, at the time of an event being triggered, data is gathered detailing the exact position of the vessel, its speed and heading. In this way, if it is necessary to launch a search party or a rescue vessel, it is possible to readily locate the last known position of the missing person.

The video sensor is equipped with a low light, high resolution, colour camera. For night time operation, the video sensor is provided with an infra red cut filter, which is arranged to automatically locate in front of the lens of the sensor. The purpose of the infra red cut filter is to attenuate the effect of bright lighting provided on the vessel and which could interfere with the operation of the video sensor. The infrared cut filter is movable between a first position in front of the lens and a second position away from the lens. The motion of the filter between the 2 positions can be achieved automatically by means of an ambient light sensor or can be initiated manually if desired.

Figure 4:
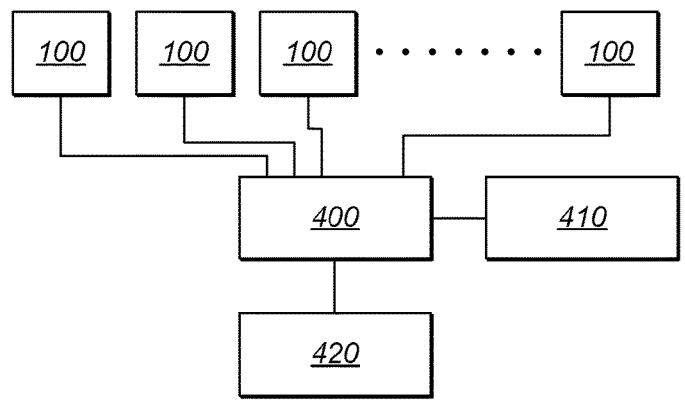
FIG. 4 shows a block diagram of an embodiment of the present invention.

FIG. 4 illustrates a complete system according to an embodiment of the present invention. At the heart of the system is the control system 400, which includes one or ore interfaces to receive or transmit signals from/to other parts of the system. It further includes a suitable processor, arranged to operate detection algorithms and otherwise control the operation of the system.

The control system 400 is coupled to a plurality of sensor nodes 100, each of which is in communication with the control system. In a normal, non-alarm, state, each sensor node may be polled periodically to ensure that all communication links are operating properly. In the event of one or more sensor nodes 100 being triggered by a possible MOB event, a priority signal or interrupt is sent to the control system.

The control system 400 is also coupled to a display 410, which is operable to continuously display the status of the system. In a non-alarm state, the display may indicate that the system is operating normally and there are no current MOB events. In the event of an MOB event, the display will prominently display a warning and an audible alarm will be sounded.

At this point, a user is given the opportunity to review the video footage captured from the time immediately before and after detection of a possible body falling from the vessel.

Also coupled to control system is an encrypted archive 420. This takes the form of a remote drive or server, physically separated from the remainder of the system and inaccessible in normal use. By inaccessible, it is meant that the physical location of the archive 420 is inaccessible as well as the data stored thereon. The intention is that in the event of an MOB event, the video and associated positional data is stored in the archive 420 in an encrypted form, so that may later be extracted, decrypted and possibly used as evidence, should that be required.

Figure 5:
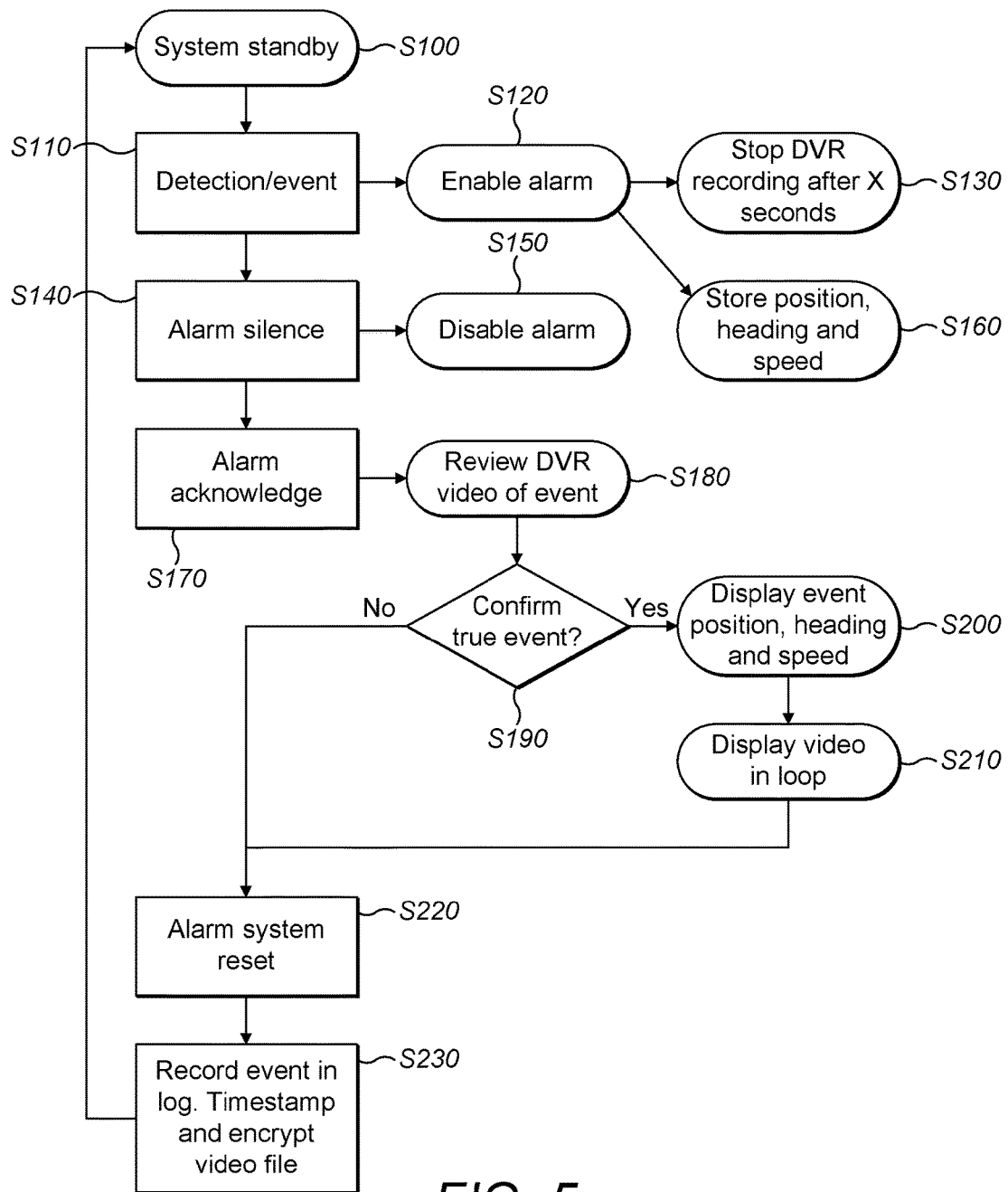
FIG. 5 shows a flowchart illustrating a method of use according to an embodiment of the present invention.

FIG. 5 shows a flowchart illustrating the operation of a method according to an embodiment of the present invention. At step S100, the system is in standby mode, where each sensor node is active and continuously scanning its region in search of a target.

At step S110, there is a detection event, whereby an object is detected which has a sufficiently large return and satisfies the velocity test i.e. it lies within a range indicative of an object falling from the vessel under gravity.

At step S120, an alarm is enabled, which alerts crew to a possible MOB event. At the same time, video data is captured (S130) from the video sensor, such that a short time before and after the event is captured. Also at step S160, the position, heading and speed of the ship is captured and stored and associated with the event, so that this data can be used if a rescue operation is required.

At step S140, the alarm is silenced by a crew member and the alarm is then disabled at step S150.

At step S170, the alarm is acknowledged by a crew member and the video footage of the event is displayed on the control panel 410 at step S180. So far, the sequence of events follows a set pattern for all alarm events which are encountered on a ship.

At step S190, the crew member is required to confirm if the event is a true event i.e. actually a Man Overboard (MOB) or if it is a false alarm.

If a true event, at step S200, the position, heading and speed of the vessel at the time of the event is displayed, as well as the looping video of the event at step S210.

At step S220, regardless of whether the event was true or not, the system is reset and at step S230, the event is recorded digitally in a secure log, and the timestamped and encrypted video footage of the event or non-event is stored securely in the archive 420. The operation of the system then reverts to standby mode at step S100 to begin again.

Throughout this specification, the term vessel has been used to refer to the ship or platform to which an embodiment of the invention has been fitted. This term is not intended to be limiting and should be understood to refer to any moving maritime vessel, ship, boat or other floating means of transport. It should also be understood include static installations, such as oil and drilling rigs, from which there is a risk of an MOB event.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for detecting an object falling from a vessel, comprising:
    a plurality of sensor nodes arranged to be installed around a periphery of the vessel, each of the plurality of sensor nodes being provided with a Radar sensor and a video sensor; and
    a control system, arranged to receive signals from the plurality of sensor nodes and to determine if the received signals indicate a possible Man Overboard (MOB) event,
    wherein the plurality of sensor nodes are arranged to be positioned around the periphery of the vessel such that at least some of the plurality of sensor nodes are arranged to cover a volume of space defined by a relatively small distance from a surface of the vessel and an arc, located substantially parallel with the surface of the vessel, wherein the arc substantially extends in an upwards direction such that each of the plurality of sensor nodes is thereby arranged to be sensitive to objects falling towards it and wherein the arc is defined by two extremes, a first being substantially horizontal, and the second being at a predetermined angle from the first.

2. The apparatus of claim 1 wherein a possible MOB event is determined on the basis of a Radar return, having a magnitude greater than a predetermined minimum, being received at one of the plurality of sensor nodes and the return being associated with an object having a velocity within a predefined range of velocity values.

3. The apparatus as claimed in claim 1 wherein the predetermined angle is in the range 100-140°.

4. The apparatus according to claim 2, wherein if a possible MOB event is determined, then video data from the video sensor of the sensor node is captured and displayed on a control panel, the video data including data captured from before the MOB event and after the MOB event.

5. The apparatus as claimed in claim 4 further arranged to display the captured video data in a repeating loop, to facilitate user confirmation of the possible MOB event.

6. The apparatus as claimed in claim 4 further arranged to timestamp the video data and to store it in an encrypted form in an archive.

7. The apparatus as claimed in claim 6 wherein the timestamped and encrypted video data is stored in a remote location, not ordinarily accessible to a user.

8. The apparatus as claimed in claim 1 wherein the periphery includes some or all of the external perimeter of the vessel.

9. A method of detecting a possible MOB event, comprising the steps of:
    continuously scanning a plurality of regions of interest using the apparatus of claim 1, and if a possible MOB event is indicated by the apparatus, displaying to a user, video data captured contemporaneously with the possible MOB event such that a confirmation can be made.

* * * * *